United States Patent [19]

Hoover

[11] Patent Number: 5,718,162

[45] Date of Patent: Feb. 17, 1998

[54] BREWING APPARATUS

[76] Inventor: Allen E. Hoover, 5835 N. Forest Glen, Chicago, Ill. 60646

[21] Appl. No.: 728,663

[22] Filed: Oct. 10, 1996

[51] Int. Cl.$^6$ ................................................ A47J 31/00
[52] U.S. Cl. ................................................ 99/280; 99/283
[58] Field of Search ........................... 99/283, 282, 304, 99/305, 299, 280; 426/433

[56] References Cited

U.S. PATENT DOCUMENTS

| | | | |
|---|---|---|---|
| 3,433,149 | 3/1969 | Karlen et al. | 99/282 |
| 4,713,526 | 12/1987 | Smit | 99/283 X |
| 4,875,408 | 10/1989 | McGee | 99/283 |
| 5,158,793 | 10/1992 | Helbling | 99/283 X |

*Primary Examiner*—Reginald L. Alexander

[57] ABSTRACT

Disclosed is a brewing apparatus having a housing; a compartment for receiving a brewable material, the compartment having an upper opening for introducing a brewing liquid and a drain for removing the brewing liquid after brewing of at least a portion of the brewable material; and a receptacle positionable beneath the drain for receiving the brewing liquid. The receptacle is movable to an operating position wherein the receptacle is positioned beneath the drain to receive the brewing liquid and non-operating positions wherein the receptacle is not positioned beneath the drain to receive the brewing liquid. In accordance with the invention, the apparatus includes a switch for initiating the introduction of a predetermined amount of brewing liquid to the compartment, and control means for activating the switch when the receptacle is in the operating position and for deactivating the switch when the receptacle is not in the operating position. An operator thus will not be able to initiate brewing of the brewable material unless the receptacle is positioned in its operating position.

9 Claims, 2 Drawing Sheets

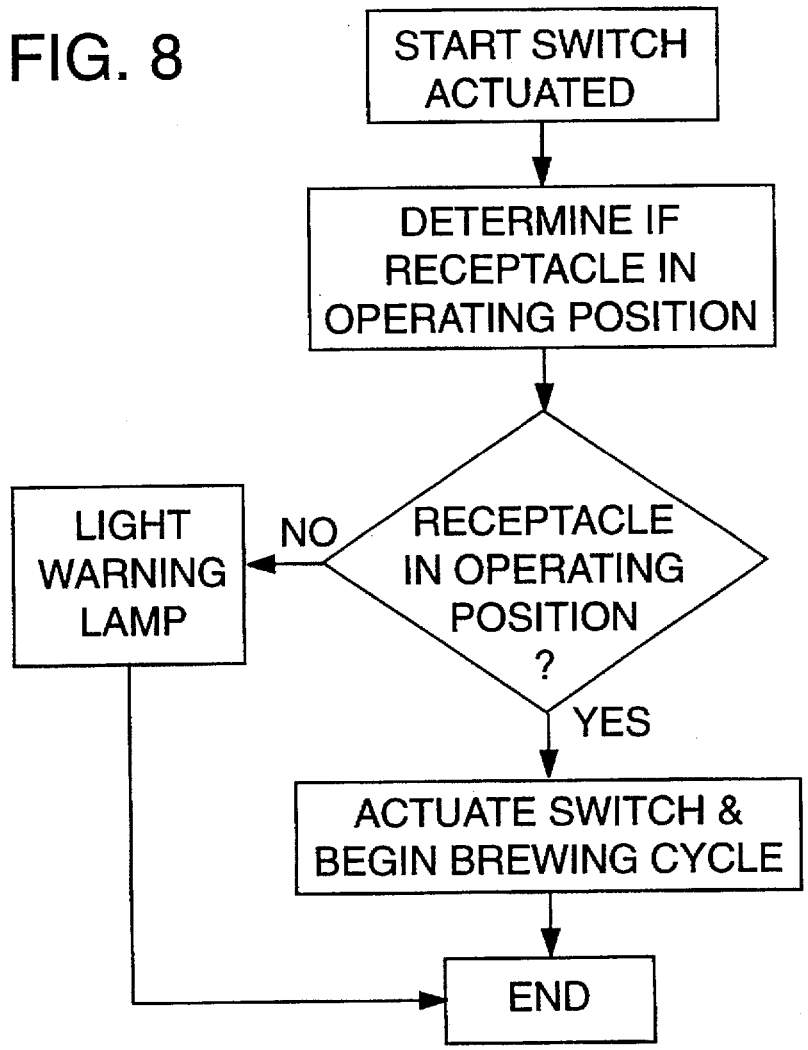

BREWING APPARATUS

TECHNICAL FIELD OF THE INVENTION

The invention is directed towards the field of brewing apparatuses, such as coffee makers. More specifically, the invention is directed towards drip- or drain-type coffee brewers having a removable receptacle for receiving the brewed coffee.

BACKGROUND OF THE INVENTION

Known drip- and drain-type coffee brewers typically comprise a housing, a compartment for receiving unbrewed coffee grinds, means for introducing a measured amount of water to the compartment and coffee grinds contained therein, a drain for passing brewed liquid coffee, and a receptacle for receiving the brewed coffee. In typical coffee brewers, the receptacle is removable for subsequent dispensing of the coffee. For example, coffee brewers designed for home use usually are sold with a glass or ceramic carafe, which is removable from the housing and from which coffee may be poured. Office-type coffee brewers are sold with multiple canister-type receptacles, which may have a latch-operated valve for dispensing coffee. In each type of coffee brewer, when a "pot" of coffee has been brewed, the receptacle is removed and placed in a location remote from the housing to allow dispensing of the brewed coffee.

Occasionally, the operator may forget to replace the receptacle before initiating the brewing cycle. The brewed coffee then will spill onto the surrounding countertop or floor, causing mess and embarrassment. In addition, because the heating element of the coffee maker may remain hot, there is an increased risk of fire if the receptacle is not properly positioned. It is a general object of the invention to provide a brewing apparatus whose brewing cycle will not initiate if the receptacle is not properly positioned to receive the drained coffee.

SUMMARY OF THE INVENTION

The invention satisfies the foregoing general object by providing a brewing apparatus including a switch for initiating the introduction of a predetermined amount of brewing liquid to the coffee or other brewable material. In accordance with the invention, the apparatus includes control means for activating the switch when the receptacle, such as the pitcher or canister, is properly positioned to receive the brewed liquid exiting from the drain, and for deactivating the switch when the receptacle is not so positioned.

Thus, in accordance with the invention, the apparatus comprises a housing; associated with said housing, a compartment for receiving a brewable material, said compartment having an upper opening for introducing a brewing liquid and a drain for removing said brewing liquid after brewing of at least a portion of said brewable material; a receptacle positionable beneath said drain for receiving said brewing liquid, said receptacle movable to an operating position wherein said receptacle is positioned beneath said drain to receive said brewing liquid and non-operating positions wherein said receptacle is not positioned beneath said drain to receive said brewing liquid; a switch for initiating the introduction of a predetermined amount of said brewing liquid to said compartment; and control means for activating said switch when said receptacle is in said operating position and for deactivating said switch when said receptacle is not in said operating position. Other features of the invention will be apparent from the specification and appended claims and drawings.

DESCRIPTION OF THE DRAWINGS

FIG. 8 is a flowchart representation of one embodiment of the control logic of the invention.

DESCRIPTION OF THE INVENTION

Figure 1:
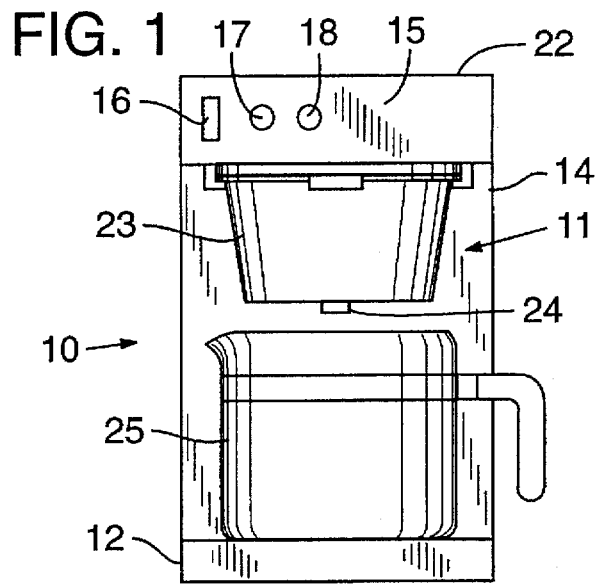
FIG. 1 is a perspective view of a brewing apparatus in accordance with the invention.
Figure 2:
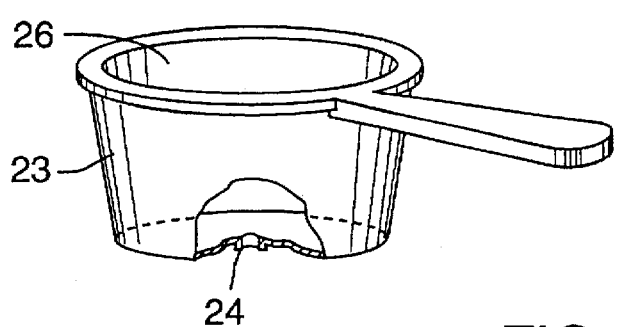
FIG. 2 is a partially cut-away perspective view of the brewing compartment of the apparatus shown in FIG. 1.

The invention contemplates an apparatus for brewing a brewable material, such as coffee, with a brewing fluid, like numerals designate like parts, apparatus 10, as shown in FIG. 1, includes a housing 11 having a base 12, a body 14, and a top control module 15. The control module includes a switch 16, and preferably a brewing indicator lamp 17 and a "pot absent" warning lamp 18. In the illustrated embodiment, the switch 16 controls a heating element (not shown) disposed within the base 12. A predetermined amount of water is poured into the apparatus, wherein it is heated by the heating element to steam. The steam condenses on the interior surface of the top wall 22 of the apparatus 10, where it falls through a compartment 23 which contains a brewable material, such as coffee. After leaching of the ground coffee, the water passes through the drain 24 and into a receptacle 25 disposed in an operating position beneath the drain 24. FIG. 2 better illustrates the compartment 23, and illustrates that the compartment 23 includes an upper opening 26 for allowing introduction of water and a drain 24 for allowing brewed coffee to exit.

It is further contemplated that the apparatus of the invention may take the form of an office-type brewer. Such brewers typically are permanently connected to a water supply. The amount of water needed for the brewing cycle is predetermined by metering elements within the apparatus.

Figure 3:
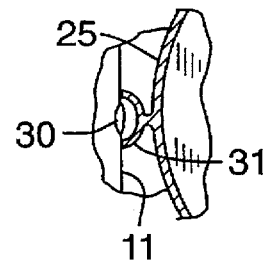
FIG. 3 is an enlarged top plan view of one embodiment of the control means of the invention.

In accordance with the invention, the apparatus includes control means for activating or deactivating the switch 16. By "activating" or "deactivating" is contemplated any action that allows or disallows the heating element to be operated by the switch. One example of such control means is illustrated in FIG. 3. As illustrated, the housing 11 includes light sensing means 30 that ordinarily receive light when the receptacle is not in its operating position. The light sensing means may be, for example, a commercially available light sensor. In accordance with this embodiment of the invention, the receptacle 25 is equipped with integrally associated light blocking means 31, which may be, for example, an opaque plastic plate.

When the receptacle is in its operating position, the plastic plate covers the light sensor to thereby prevent light from being received by the light sensor. In accordance with this embodiment of the invention, the apparatus includes means responsive to the light sensing means for activating the switch (i.e., allowing the switch to operate the heating element and to thereby initiate brewing) only when the light sensing means is not receiving light. Thus, if the receptacle is not in its operating position, and assuming the operator is not attempting to operate the apparatus in a darkened room, the switch will not be active, and the brewing cycle will not begin. The apparatus may further include a light source (not shown) for ordinarily transmitting light to the light sensor.

The means responsive to the light sensing means may take any suitable form, and may be, for example, a control circuit. Any number of circuits may be prepared by one of ordinary skill in the art. A preferred control logic is outlined in FIG. 8. Preferably, if the user attempts to actuate the switch when the receptacle is not in its operating position, a warning lamp will be lit, thus reminding the user to properly position the receptacle.

Figure 4:
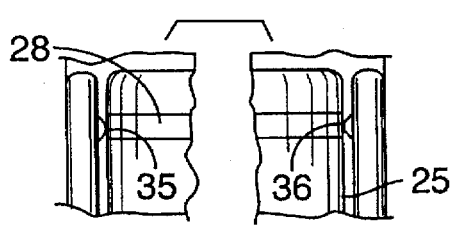
FIG. 4 is an enlarged top plan view of a second embodiment of the control means of the invention.

Other embodiments of the invention are also contemplated. For example, the housing may include a control circuit that is ordinarily broken when the receptacle is in not in the operating position. The receptacle may include electrical connector means positioned to complete the control circuit when the receptacle is in the operating position. FIG. 4 illustrates the terminal ends 35, 36 of the broken control circuit and the electrical connector 28 disposed on the receptacle 25. Preferably, the electrical connector is in the form of a metal band disposed around the periphery of the receptacle. The receptacle also may include a plug (not shown) for mateably engaging a socket (not shown) disposed within the housing 11.

Figure 5:
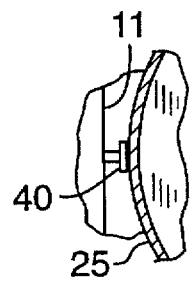
FIG. 5 is an enlarged front plan view of a third embodiment of the control means of the invention, shown when the receptacle is in the non-operating position.
Figure 6:
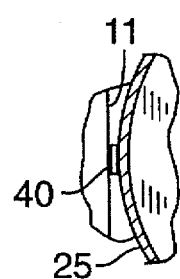
FIG. 6 is an enlarged front plan view of a third embodiment of the control means of the invention, shown when the receptacle is in the operating position.
Figure 7:
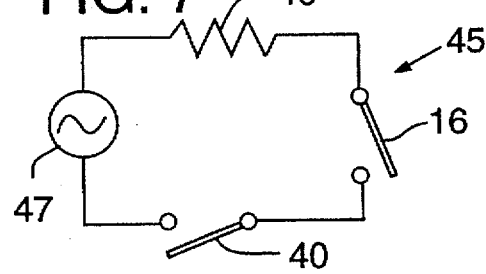
FIG. 7 is a schematic illustration of a control circuit useful in conjunction with the invention.

In another embodiment, the electrical connection means are associated with the housing 11. FIGS. 5 and 6 illustrate the receptacle 24 in non-operating and operating positions respectively. A compression switch 40 is disposed on the housing 11. When the receptacle is not in its operating position, as shown in FIG. 5, the switch 40 is open. When the receptacle is properly placed in its operating position, as shown in FIG. 6, the switch 40 closes to complete the control circuit. FIG. 7 illustrates a control circuit 45 suitable for use in conjunction with the embodiment illustrated in FIGS. 5 and 6. The heating element 46 is powered by a power supply 47. If the user attempts to actuate the switch 16 on the control module 15, the heating element circuit will not close unless the compression switch 40 is closed by the receptacle 25.

The components of the apparatus of the invention are conventional, and may be made and assembled by conventional methods.

Thus, it is seen that the present invention has satisfied the foregoing general object. The brewing cycle of the brewing apparatus will not initiate if the receptacle is not properly positioned to receive the drained coffee or other brewed fluid.

While particular embodiments of the invention have been shown, it will of course be understood that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

What is claimed is:

1. Brewing apparatus comprising:

a housing;

associated with said housing, a compartment for receiving a brewable material, said compartment having an opening for introducing a brewing liquid and a drain for removal of said brewing liquid after brewing of at least a portion of said brewable material;

a receptacle positionable beneath said drain for receiving said brewing liquid exiting said drain, said receptacle movable to an operating position wherein said receptacle is positioned beneath said drain to receive said brewing liquid and non-operating positions wherein said receptacle is not positioned beneath said drain to receive said brewing liquid exiting said drain;

a switch for initiating the introduction of a predetermined amount of said brewing liquid to said compartment; and control means for activating said switch when said receptacle is in said operating position and for deactivating said switch when said receptacle is not in said operating position, said control means being separate from said switch when said receptacle is in said operating position.

2. Apparatus according to claim 1, wherein said control means comprises:

light sensing means associated with said housing, said light sensing means ordinarily receiving light when said receptacle is not in said operating position;

light blocking means associated with said receptacle, wherein said light blocking means prevent said light from reaching said light sensing means when said receptacle is in said operating position; and means responsive to said light sensing means for activating said switch only when said light sensing means is not receiving light.

3. Apparatus according to claim 1, wherein said control means comprises:

a control circuit associated with said housing, said control circuit being ordinarily broken when said receptacle is not in said operating position;

electrical connection means associated with said receptacle and positioned to complete said control circuit when said receptacle is in said operating position; and means responsive to said broken circuit for activating said switch only when said control circuit is whole.

4. Apparatus according to claim 1, wherein said control means comprises:

a control circuit associated with said housing, said control circuit being ordinarily broken when said receptacle is not in said operating position;

electrical connection means associated with said housing for completing said control circuit when said receptacle is in said operating position; and means responsive to said broken circuit for activating said switch only when said control circuit is whole.

5. Brewing apparatus comprising:

a housing;

associated with said housing, a compartment for receiving a brewable material, said compartment having an opening for introducing a brewing liquid and a drain for removal of said brewing liquid after brewing of at least a portion of said brewable material;

a receptacle for receiving said brewing liquid exiting said drain, said receptacle movable to an operating position wherein said receptacle is positioned to receive said brewing liquid exiting said drain and non-operating positions wherein said receptacle is not positioned to receive said brewing liquid exiting said drain;

a switch for initiating the introduction of a predetermined amount of said brewing liquid to said compartment; and control means for activating said switch when said receptacle is in said operating position and for deactivating said switch when said receptacle is not in said operating position, wherein said control means comprises:

light sensing means associated with said housing, said light sensing means ordinarily receiving light when said receptacle is not in said operating position;

light blocking means associated with said receptacle, wherein said light blocking means prevent said light from reaching said light sensing means when said receptacle is in said operating position; and means responsive to said light sensing means for activating said switch only when said light sensing means is not receiving light.

6. Brewing apparatus comprising:

a housing;

associated with said housing, a compartment for receiving a brewable material, said compartment having an opening for introducing a brewing liquid and a drain for removal of said brewing liquid after brewing of at least a portion of said brewable material;

a receptacle for receiving said brewing liquid exiting said drain, said receptacle movable to an operating position wherein said receptacle is positioned to receive said brewing liquid exiting said drain and non-operating positions wherein said receptacle is not positioned to receive said brewing liquid exiting said drain;

a switch for initiating the introduction of a predetermined amount of said brewing liquid to said compartment; and control means for activating said switch when said receptacle is in said operating position and for deactivating said switch when said receptacle is not in said operating position, wherein said control means comprises:

a control circuit associated with said housing, said control circuit being ordinarily open when said receptacle is not in said operating position;

electrical connection means associated with one of said receptacle and said housing, said electrical connection means positioned to close said control circuit when said receptacle is in said operating position; and means responsive to said control circuit for activating said switch only when said control circuit is closed.

7. Apparatus according to claim 6, wherein said electrical connection means are associated with said receptacle.

8. Apparatus according to claim 6, wherein said electrical connection means are associated with said housing.

9. Apparatus according to claim 8, wherein said electrical connection means comprises a switch.

\* \* \* \* \*